United States Patent
Danilov et al.

(10) Patent No.: US 10,789,002 B1
(45) Date of Patent: Sep. 29, 2020

(54) HYBRID DATA DEDUPLICATION FOR ELASTIC CLOUD STORAGE DEVICES

(71) Applicant: EMC IP Holding Company LLC, Hopkinton, MA (US)

(72) Inventors: Mikhail Danilov, Saint Petersburg (RU); Kirill Gusakov, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 351 days.

(21) Appl. No.: 15/790,377

(22) Filed: Oct. 23, 2017

(51) Int. Cl.
*G06F 3/06* (2006.01)
*G06F 16/174* (2019.01)
*G06F 16/182* (2019.01)
*G06F 16/245* (2019.01)

(52) U.S. Cl.
CPC .......... *G06F 3/0641* (2013.01); *G06F 3/0608* (2013.01); *G06F 16/1748* (2019.01); *G06F 16/1844* (2019.01); *G06F 3/067* (2013.01); *G06F 16/245* (2019.01)

(58) Field of Classification Search
CPC ............... G06F 3/0641; G06F 16/1748; G06F 16/1844; G06F 3/0608; G06F 16/245; G06F 3/067
USPC ........................................................ 707/692
See application file for complete search history.

(56) References Cited

U.S. PATENT DOCUMENTS

| | | | | |
|---|---|---|---|---|
| 5,175,730 A * | 12/1992 | Murai | ................... | H04L 12/413 340/3.54 |
| 5,568,402 A * | 10/1996 | Gray | .................. | G05B 19/4183 709/224 |
| 6,256,318 B1 * | 7/2001 | O'Callaghan | ........... | H04L 12/44 370/447 |
| 6,975,626 B1 * | 12/2005 | Eberle | ...................... | H04L 47/32 370/358 |
| 8,095,756 B1 * | 1/2012 | Somavarapu | ....... | G06F 11/1453 711/162 |
| 8,190,835 B1 * | 5/2012 | Yueh | ..................... | G06F 3/0608 711/162 |
| 8,234,250 B1 * | 7/2012 | Sharma | .................. | G06F 16/174 707/649 |

(Continued)

OTHER PUBLICATIONS

EMC White Paper, "EMC Data Domain Global Deduplication Array—A detailed Review", Jan. 2011, 24 pages. (Year: 2011).*

(Continued)

*Primary Examiner* — Phuong Thao Cao
(74) *Attorney, Agent, or Firm* — Amin, Turocy & Watson, LLP

(57) ABSTRACT

Facilitating data deduplication in an elastic cloud storage environment is provided herein. A system can comprise a processor and a memory that stores executable instructions that, when executed by the processor, facilitate performance of operations. The operations can comprise facilitating a first deduplication of first data at a first storage device based on a determination that the first storage device comprises duplicated data. The operations can also comprise sending, by the system, a request for a second deduplication at a second storage device after completion of the first deduplication at the first storage device. In addition, the operations can comprise facilitating, by the system, the second deduplication of second data at the second storage device, wherein the second data comprises a copy of the duplicated data.

20 Claims, 8 Drawing Sheets

(56) References Cited

U.S. PATENT DOCUMENTS

| | | | |
|---|---|---|---|
| 8,234,468 B1* | 7/2012 | Deshmukh | G06F 16/1748 711/162 |
| 8,285,681 B2* | 10/2012 | Prahlad | G06F 3/0649 707/640 |
| 8,316,370 B2* | 11/2012 | Dai | G06F 9/526 711/150 |
| 8,396,841 B1* | 3/2013 | Janakiraman | G06F 3/0608 707/692 |
| 8,612,699 B2* | 12/2013 | Jain | G06F 11/1088 711/159 |
| 8,825,720 B1* | 9/2014 | Xie | G06F 16/1748 707/813 |
| 8,930,653 B1* | 1/2015 | Chatterjee | G06F 11/1453 711/154 |
| 8,990,168 B1* | 3/2015 | Hartway | G06F 16/10 707/687 |
| 9,037,825 B1* | 5/2015 | Donlan | G06F 3/0619 707/687 |
| 9,483,199 B1* | 11/2016 | Floyd | G06F 3/0641 |
| 9,678,973 B2* | 6/2017 | Trimble | G06F 16/1748 |
| 9,753,938 B2* | 9/2017 | Mallaiah | G06F 3/067 |
| 10,333,789 B1* | 6/2019 | Dippenaar | H04L 63/00 |
| 10,467,431 B2* | 11/2019 | Yun | G06F 21/6245 |
| 2004/0258136 A1* | 12/2004 | Liu | H04B 1/7156 375/133 |
| 2005/0160238 A1* | 7/2005 | Steely, Jr. | G06F 12/0831 711/145 |
| 2007/0011382 A1* | 1/2007 | Roever | G06F 13/1663 710/240 |
| 2007/0050415 A1* | 3/2007 | Armangau | G06F 3/0605 |
| 2009/0063528 A1* | 3/2009 | Yueh | G06F 3/0641 |
| 2010/0083266 A1* | 4/2010 | Dai | G06F 9/526 718/103 |
| 2010/0161554 A1* | 6/2010 | Datuashvili | G06F 16/24556 707/610 |
| 2010/0287256 A1* | 11/2010 | Neilio | G06Q 10/10 709/217 |
| 2011/0055471 A1* | 3/2011 | Thatcher | G06F 3/0608 711/114 |
| 2011/0093439 A1* | 4/2011 | Guo | G06F 11/1453 707/679 |
| 2011/0191305 A1* | 8/2011 | Nakamura | G06F 3/0608 707/692 |
| 2012/0016845 A1* | 1/2012 | Bates | G06F 3/0608 707/692 |
| 2012/0191671 A1* | 7/2012 | Kitamura | G06F 16/1748 707/692 |
| 2012/0317084 A1* | 12/2012 | Liu | G06F 3/0641 707/692 |
| 2012/0330903 A1* | 12/2012 | Periyagaram | G06F 3/067 707/692 |
| 2012/0330904 A1* | 12/2012 | Factor | G06F 16/1748 707/692 |
| 2013/0006947 A1* | 1/2013 | Akinyemi | G06F 16/178 707/687 |
| 2013/0046949 A1* | 2/2013 | Colgrove | G06F 3/0608 711/170 |
| 2013/0086006 A1* | 4/2013 | Colgrove | G06F 16/1752 707/692 |
| 2013/0097380 A1* | 4/2013 | Colgrove | G06F 3/0641 711/118 |
| 2013/0144846 A1* | 6/2013 | Chhaunker | G06F 7/00 707/692 |
| 2013/0290274 A1* | 10/2013 | Patil | G06F 11/1453 707/690 |
| 2013/0339605 A1* | 12/2013 | Factor | G06F 16/10 711/118 |
| 2014/0025917 A1* | 1/2014 | Kaczmarczyk | G06F 11/1448 711/173 |
| 2014/0067776 A1* | 3/2014 | Larson | G06F 16/1748 707/692 |
| 2014/0114932 A1* | 4/2014 | Mallaiah | G06F 3/067 707/692 |
| 2014/0122818 A1* | 5/2014 | Hayasaka | G06F 3/0641 711/162 |
| 2014/0149476 A1* | 5/2014 | Kishimoto | G06F 16/1748 707/827 |
| 2014/0207918 A1* | 7/2014 | Kowalski | G06F 11/0709 709/220 |
| 2014/0297603 A1* | 10/2014 | Kim | G06F 16/1752 707/692 |
| 2014/0325147 A1* | 10/2014 | Nayak | G06F 3/0641 711/114 |
| 2014/0344395 A1* | 11/2014 | Alexander | G06F 9/4856 709/217 |
| 2015/0074065 A1* | 3/2015 | Christ | G06F 3/067 707/692 |
| 2015/0106345 A1* | 4/2015 | Trimble | G06F 16/1748 707/692 |
| 2015/0199373 A1* | 7/2015 | Mason | G06F 16/182 707/692 |
| 2015/0227543 A1* | 8/2015 | Venkatesh | G06F 9/45533 707/620 |
| 2015/0317205 A1* | 11/2015 | Gray | G06F 3/067 714/766 |
| 2015/0378775 A1* | 12/2015 | Vermeulen | G06F 16/1748 707/692 |
| 2016/0036912 A1* | 2/2016 | Nishibori | G06F 12/0866 709/203 |
| 2016/0062937 A1* | 3/2016 | Huang | G06F 13/4031 710/116 |
| 2016/0125118 A1* | 5/2016 | Chaudhuri | G06F 30/34 716/101 |
| 2016/0139849 A1* | 5/2016 | Chaw | G06F 3/0641 711/119 |
| 2016/0267098 A1* | 9/2016 | Mallaiah | G06F 3/0641 |
| 2016/0283372 A1* | 9/2016 | Davis | G06F 12/0261 |
| 2017/0024409 A1* | 1/2017 | Shekhar | G06F 16/1748 |
| 2017/0123935 A1* | 5/2017 | Pandit | G06F 11/1446 |
| 2017/0177610 A1* | 6/2017 | Knotts | G06F 16/1767 |
| 2017/0192860 A1* | 7/2017 | Vijayan | G06F 3/0641 |
| 2017/0208125 A1* | 7/2017 | Jai | G06F 21/62 |
| 2017/0212690 A1* | 7/2017 | Babu | G06F 3/0608 |
| 2017/0315875 A1* | 11/2017 | Tirupati Nagaraj | G06F 16/2272 |
| 2018/0039423 A1* | 2/2018 | Yoshii | G06F 3/0641 |
| 2018/0060348 A1* | 3/2018 | Power | G06F 16/1752 |
| 2018/0143780 A1* | 5/2018 | Cho | G06F 3/0688 |
| 2018/0143994 A1* | 5/2018 | Ohtsuji | G06F 3/0608 |
| 2018/0173731 A1* | 6/2018 | Nazari | G06F 16/215 |
| 2018/0329631 A1* | 11/2018 | Swift | G06F 3/0656 |
| 2019/0073151 A1* | 3/2019 | Marinescu | G06F 3/0673 |
| 2019/0087286 A1* | 3/2019 | Kumar | G06F 11/1469 |

OTHER PUBLICATIONS

Koo et al., "A Hybrid Deduplication for Secure and Efficient Data Outsourcing in Fog Computing", 2016 IEEE 8th International Conference on Cloud Computing Technology and Science, IEEE Computer Society, 2016, pp. 285-293. (Year: 2016).*

Li et al., "Efficient Hybrid Inline and Out-of-line Deduplication for Backup Storage", ACM Trans. Storage, vol. 11, No. 1, 2014, pp. 2:1-2:21. (Year: 2014).*

Mandal, S., "Design and Implementation of an Open-Source Deduplication Platform for Research", Technical Report FSL-15-03, Dec. 2015, 52 pages. (Year: 2015).*

Abusaimeh et al., "Hybrid Data Deduplication Technique in Cloud Computing for Cloud Storage", Journal of Theoretical and Applied Information Technology, Dec. 31, 2017, vol. 95, No. 24, pp. 7069-7081. (Year: 2017).*

Fan et al., "Hybrid Data Deduplication in Cloud Environment", in Proceedings of 2012 International Conference on Information Security and Intelligent Control, IEEE, Aug. 14-16, 2012, pp. 174-177. (Year: 2012).*

Lokeshwari et al., "Optimized Cloud Storage with High Throughput Deduplication Approach", International Conference on Emerging

(56) References Cited

OTHER PUBLICATIONS

Technology Trends (ICETT), published by International Journal of Computer Applications (IJCA), 2011, pp. 32-37. (Year: 2011).*

* cited by examiner

HYBRID DATA DEDUPLICATION FOR ELASTIC CLOUD STORAGE DEVICES

TECHNICAL FIELD

The subject disclosure relates generally to data storage. More specifically, this disclosure relates to hybrid data deduplication for elastic cloud storage devices.

BACKGROUND

Distributed storage systems and/or object storage systems can provide a wide range of storage services while achieving high scalability, availability, and serviceability. An example of such storage systems is referred to as Elastic Cloud Storage (ECS), which uses the latest trends in software architecture and development to achieve the above noted services, as well as other services.

Elastic cloud storage can implement multiple storage Application Programming Interfaces (APIs), which can include a Content-Addressable Storage (CAS) platform for data archiving, a web service that provides storage through web service interfaces, as well as others. Entities with applications that use the APIs supported can benefit from switching to elastic cloud storage. Accordingly, unique challenges exist to provide performance and processing efficiency for data retained in elastic cloud storage.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments relate to a method that can comprise facilitating, by a system comprising a processor, a first removal of first data at a first storage device based on a determination that the first data is a first duplicate of second data at the first storage device. The method can also comprise facilitating, by the system, a second removal of third data at a second storage device. The third data can be a second duplicate of the second data. In addition, facilitating the second removal can be based on a request received from the first storage device to evaluate the third data.

Another embodiment relates to a system comprising a processor and a memory that stores executable instructions that, when executed by the processor, facilitate performance of operations. The operations can comprise facilitating a first deduplication of first data at a first storage device based on a determination that the first storage device comprises duplicated data. The operations can also comprise sending, by the system, a request for a second deduplication at a second storage device after completion of the first deduplication at the first storage device. In addition, the operations can comprise facilitating, by the system, the second deduplication of second data at the second storage device, wherein the second data comprises a copy of the duplicated data.

A further embodiment relates to a computer-readable storage medium comprising instructions that, in response to execution, cause a system comprising a processor to perform operations. The operations can comprise facilitating a first removal of first data at a first device based on a determination that the first data is duplicate data of second data at the first device. The operations can also comprise facilitating a second removal of third data at a second device. The third data can be the duplicate data of the second data. Further, facilitating the second removal can be based on a request received from the first device to remove the duplicate data. The first device can be alerted to the duplicate data based on a replication request from the second device to replicate the third data at the first device.

According to some implementations, the operations can comprise designating the second data at the first device as immutable data. The immutable data can be used to resolve deduplication conflicts between the first device and the second device.

In some implementations, the operations can comprise maintaining a first identification for the first data, and a second identification of the second data at the first device. Further to this implementation, the operations can comprise maintaining a third identification for the third data at the second device.

In additional, or alternative, implementations, the operations can comprise facilitating the first removal of the first data using an inline deduplication that replaces the first data with a first reference to the second data. In accordance with these implementations the operations can also comprise facilitating the second removal of the third data based on a post-process deduplication that replaces the third data with a second reference to the second data at the first device.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
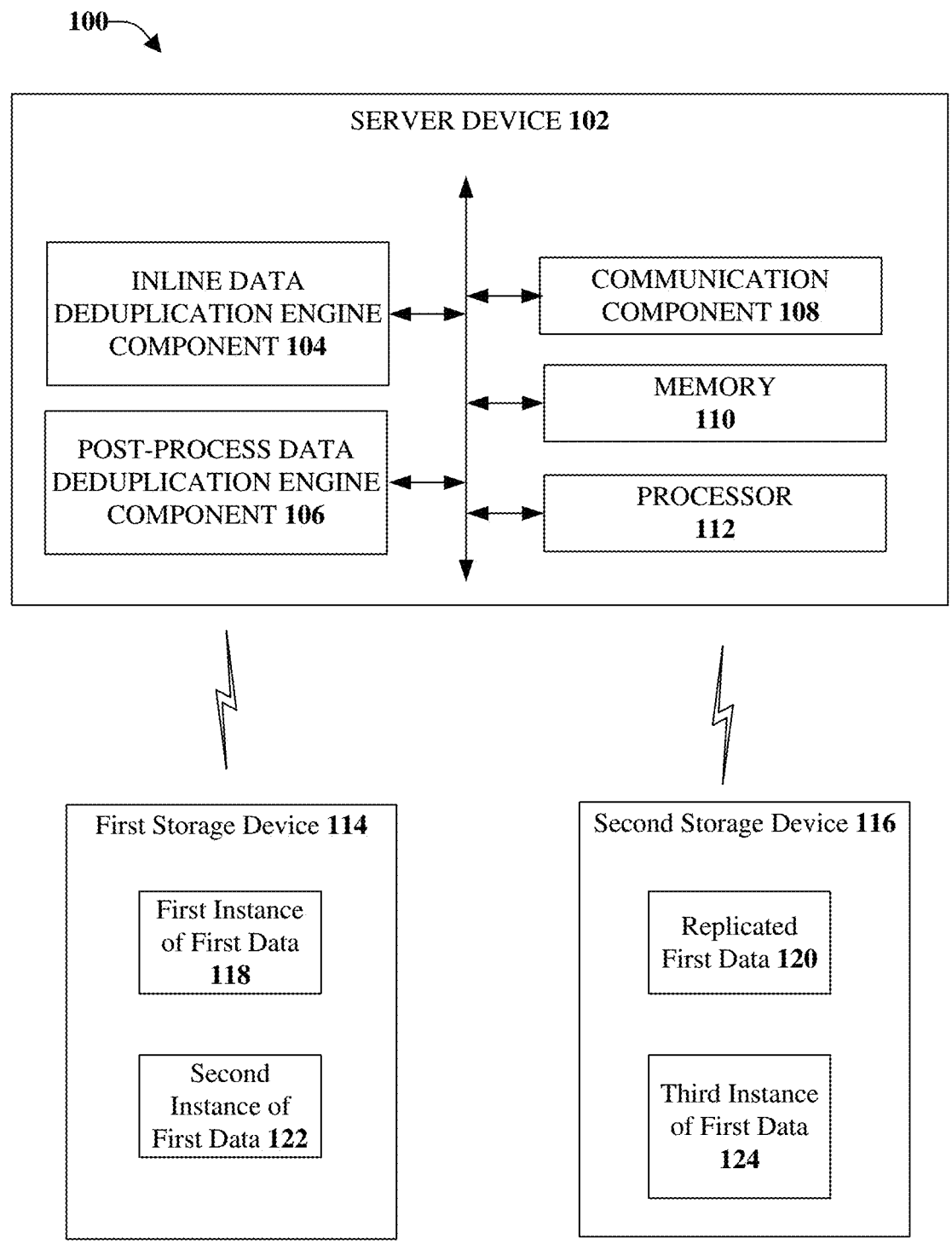
FIG. 1 illustrates an example, non-limiting, system for data deduplication between storage devices in accordance with one or more embodiments described herein.
Figure 2:
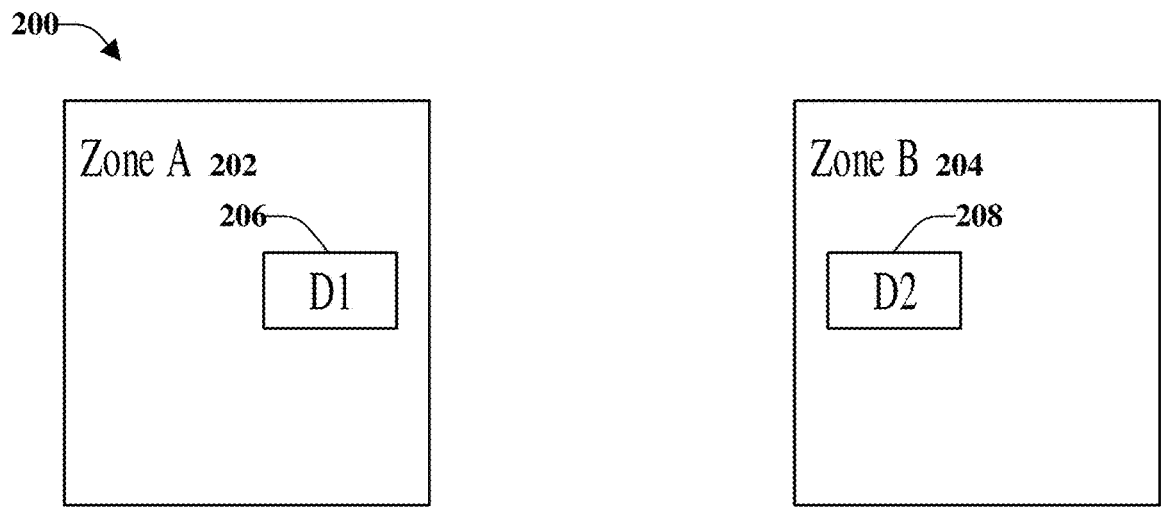
FIG. 2 illustrates an example, non-limiting system that comprises two zones and two data portions in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Elastic Cloud Storage (ECS) uses cutting-edge technology to implement many of its functions. In particular, ECS uses a specific method for disk capacity management and does not solely rely on a file system. The disk space is partitioned into a set of blocks of fixed size, referred to as "chunks." All the information, user data, and different kinds of metadata, are stored in these chunks. Further, chunk content is modified in append-only mode. When a chunk becomes full (e.g., based on a defined used amount of space), the chunk is sealed. Content of sealed chunks is immutable.

There are different types of chunks, one type per capacity user. In particular, user data is stored in repository chunks (or simply repo chunks). The metadata is stored in tree-like structures, referred to as "tree chunks." Chunks of the one or more types (e.g., repo chunks and tree chunks) are shared. For example, a repo chunk can contain segments of several user objects and a tree chunk can contain elements of several trees.

Use of repo chunks assures high write performance and capacity efficiency when storage clients only write data. When storage clients also delete data, it can cause severe internal chunk fragmentation. As a result, capacity use efficiency can become an issue. In addition, the fact that chunks are immutable does not allow implementing simple but fine-grained reclamation of unused capacity. Capacity reclamation should be implemented at the chunk level. Accordingly, after some data is deleted, the capacity the data previously occupied can be reclaimed with some delay.

ECS runs a set of storage services, which together implement business logic of storage, which is referred to as "blob service." Blob service maintains an object table that keeps track of all objects in the system. In particular, the object table contains location information for the objects. There is also a chunk manager service that maintains a chunk table. The tables (e.g., the object table and/or the chunk table) are implemented as search trees under a multi-version concurrency control policy. These trees are large and, therefore, the major part of the one or more trees resides on hard drives. As clear from the description above, a single tree update is an expensive operation. Accordingly, trees are not updated for a single data update. Instead, the one or more trees have respective journals of data updates and, when the journal is full (e.g., based on a defined fullness level), the journal processor starts. For example, the journal processor implements bulk tree updates in order to minimize the total cost of the update. Tree journals are stored in journal chunks.

As indicated by its name, ECS is a cloud storage. The corresponding feature is called GEO since ECS supports geographically distributed setups consisting of two or more zones. GEO can be used to provide an additional protection of user data by means of replication. However, ECS does not replicate objects. The replication mechanism works at the chunk level. Namely, ECS replicates repo chunks with user data and journal chunks with system and user metadata. Chunk manager service at a replication target zone registers incoming chunks. Various services, such as blob service and chunk manager, "re-play" journals the zone receives from other zones and update their local trees (tables).

Geographically distributed ECS arrangements maintain a global (GEO level) namespace of objects and assure strong consistency for user data. This can be achieved via defining a primary zone for the one or more objects. Normally, it is a zone that has created an object. Even after an object is fully replicated to all zones, all requests related to the object are handled by its primary zone.

Accordingly, data deduplication is an important feature for high-end storage systems. Thus, there is a need for data deduplication in ECS, which is provided with the disclosed aspects. Data deduplication is a process that eliminates redundant copies of a data portion to reduce storage overhead. Further, the data deduplication provided herein also can consider the specific features of ECS architecture to assure low overheads but high reliability and efficiency of data deduplication.

FIG. 1 illustrates an example, non-limiting, system 100 for data deduplication between storage devices in accordance with one or more embodiments described herein. The system 100 (as well as other systems discussed herein) can be implemented as a storage system that supports data deduplication (e.g., an elastic cloud storage). Thus, the system 100 can facilitate the deduplication of data across geographically distributed systems that comprises two or more zones.

The system 100 can include a server device 102 that can perform data deduplication among different storage zones as discussed herein. The server device 102 can include an inline data deduplication engine component 104, a post-process data deduplication engine component 106, a communication component 108, at least one memory 110, and at least one processor 112. The server device 102 can interact with a first storage device 114 and at least a second storage device 116.

In some implementations, the storage devices (e.g., the first storage device 114, at least the second storage device 116, and subsequent storage devices) can be referred to as geographically distributed setups or zones (e.g., a first zone, a second zone, and/or subsequent zones). Further, although the server device 102 is illustrated and described as a component separate from the first storage device 114 and the second storage device 116, the server device 102 can be included, at least partially in the first storage device 114 and/or the second storage device 116. In some implementations, the storage devices can include the functionality of the server device. For example, the first storage device 114 can include a first server device (that includes the functionality of the server device 102) and the second storage device 116 can include a second server device (that includes the functionality of the server device 102). Accordingly, the first server device and the second server device can be in communication, but can operate independently from one another.

As used herein, the term "storage device," "first storage device," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

The inline data deduplication engine component 104 can determine duplicate data is retained at the first storage device 114. For example, a first instance of first data 118 can be stored in the first storage device 114, and replicated to the second storage device 116 as replicated first data 120. Thereafter, respective copies of the first instance of first data 118 can be stored at both the first storage device 114 and the second storage device 116. For example, the duplicate copy of the first instance of first data 118 can be stored at the first storage device 114 as a second instance of first data 122. Further, the duplicate copy of the first instance of first data 118 can be stored at the second storage device 116 as a third instance of first data 124. It is noted that although not illustrated and described, the first storage device 114 and/or the second storage device 116 can comprise other data, which can be replicated between the storage devices.

The first storage device 114 can determine that there are duplicate copies of the first data (e.g., the first instance of first data 118 and the second instance of first data 122) stored at the first storage device 114. Therefore, inline data deduplication can be performed by the inline data deduplication engine component 104 at the first storage device 114. During the inline data deduplication, the inline data deduplication engine component 104 can replace the second instance of the first data 122 with a reference to the first instance of the first data 118.

Further, since the third instance of first data 124 was also stored at the second storage device 116, a request to replicate the third instance of first data 124 can be sent (e.g., via the communication component 108) from the second storage device 116 and received at the first storage device 114. Based on this request, the first storage device 114 can determine that the request is for a duplicate of the first instance of first data 118. Upon or after the determination, the communication component 108 can send a request from the first storage device 114 to the second storage device 116 to perform deduplication of the third instance of first data 124.

Upon or after receipt of the deduplication request at the second storage device 116, the post-process data deduplication engine component 106 can replace the copy of the third instance of first data 124 in the second storage device 116 with a reference to the copy of the first data 118 owned by the first storage device 114. Thus, the first storage device 114 can be the primary zone for the first instance of first data 118.

In further detail, the disclosed aspects provide hybrid data deduplication in ECS. The hybrid data deduplication combines inline and post-process deduplication techniques to obtain a tradeoff between inline overheads and efficiency of data deduplication in a GEO environment. It is noted that the variant of post-process deduplication described herein works inline with GEO replication.

As mentioned, data deduplication is a process that eliminates redundant copies of a data portion to reduce storage overhead. With deduplication, a storage system keeps a single physical copy of a data portion. All blocks, files, objects, and so on that contain the data portion are changed to reference the single physical copy (e.g., as discussed above with reference to the second instance of first data 122 and the third instance of first data 124).

There are at least two techniques for data deduplication, namely, inline deduplication and post-process deduplication Inline deduplication performs deduplication of data before it is written to a primary storage device (e.g., a hard drive). Therefore, data deduplication works inline with data creation within a storage system. Post-process deduplication waits for data to land on a primary storage device before initiating the deduplication process. Therefore, the deduplication process can work in background mode. It is noted that the inline deduplication process creates certain inline overhead. On the other hand, post-process deduplication requires some extra capacity.

Regardless of the moment data deduplication takes place, a deduplication engine (e.g., the inline data deduplication engine component 104, the post-process data deduplication engine component 106) implements a similar logic. The engine (e.g., the inline data deduplication engine component 104, the post-process data deduplication engine component 106) can calculate a fingerprint (e.g., a hash value, such as MD5 algorithm) for a data portion and can compare the fingerprint to fingerprints of existing data portions. If there is a data portion with the same fingerprint, the engine (e.g., the inline data deduplication engine component 104, the post-process data deduplication engine component 106) can perform a byte-by-byte comparison for the data portions. If the engine (e.g., the inline data deduplication engine component 104, the post-process data deduplication engine component 106) detects identical data, the engine (e.g., the inline data deduplication engine component 104, the post-process data deduplication engine component 106) can perform deduplication.

As it relates to ECS, capacity reclamation can take quite some time since ECS runs on powerful hardware nodes. Therefore, with the disclosed aspects, first inline deduplication can be performed (e.g., via the inline data deduplication engine component 104). Thereafter, post-process deduplication can be performed (e.g., via the post-process data deduplication engine component 106).

As discussed herein, inline deduplication can be implemented first for ECS. Inline deduplication for a cluster is a relatively simple feature to implement. This technique can assure a much more impressive effect in terms of capacity because there is no need in capacity reclamation for a data portion, which had been deduplicated before it was written to a chunk. The inline overheads can be minimal if it is taken into account that a hash value for a new data portion to be written is often calculated at the storage client side and this value is sent to the storage system as a part of a write transaction for the validation purpose.

In some cases, the storage devices (e.g., the first storage device 114 and the second storage device 116) can be included in respective storage devices, which can include one or more services and/or one or more storage devices. In some embodiments, a storage device can comprise various services including: an authentication service to authenticate requests, storage APIs to parse and interpret requests, a storage chunk management service to facilitate storage chunk allocation/reclamation for different storage system needs and monitor storage chunk health and usage, a storage server management service to manage available storage devices capacity and to track storage devices states, and a storage server service to interface with the storage devices.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

With continuing reference to the server device 102, the at least one memory 110 can be operatively coupled to the at least one processor 112. The at least one memory 110 can store protocols associated with facilitating inline and/or post-process data deduplication in a data storage environment as discussed herein. Further, the at least one memory 110 can facilitate actions to control communication between the server device 102 and the one or more storage devices (e.g., the first storage device 114, the second storage device 116), such that the system 100 can employ stored protocols and/or algorithms to achieve improved storage management through data deduplication as described herein.

It should be appreciated that data store components (e.g., memories) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 112 can facilitate processing data related to data deduplication as discussed herein. The at least one processor 112 can be a processor dedicated to analyzing and/or generating information received, a processor that controls one or more components of the system 100, and/or a processor that both analyzes and generates information received and controls one or more components of the system 100.

To more fully describe the various aspects, FIGS. 2-7 illustrate an example, non-limiting system 200 that comprises two zones and two data portions in accordance with one or more embodiments described herein. Repetitive description of like elements employed in other embodiments described herein is omitted for sake of brevity.

The system 200 can comprise one or more of the components and/or functionality of the system 100, and vice versa. Illustrated are a first zone or zone A 202 (e.g., the first storage device 114 or the second storage device 116) and a second zone or zone B 204 (e.g., the first storage device 114 or the second storage device 116). Zone A 202 comprises a new data portion, illustrated as a first data portion D1 206. Zone B 204 can comprise another new data portion, illustrated as a second data portion D2 208.

Figure 3:
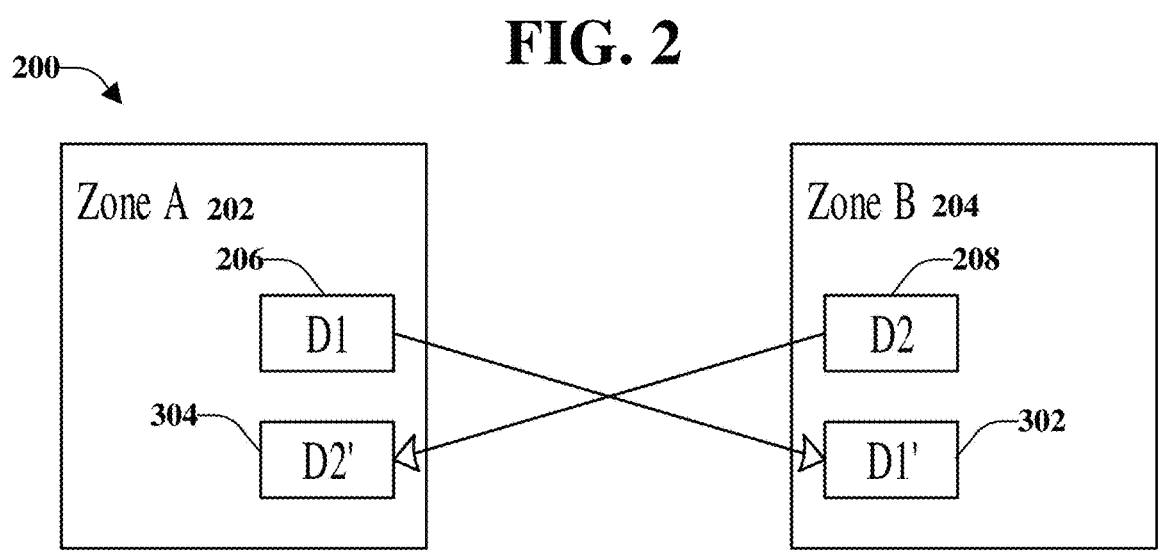
FIG. 3 illustrates an example, non-limiting replication of data portions of the system of FIG. 2 in accordance with one or more embodiments described herein.

As illustrated in FIG. 3, the first data portion D1 206 and the second data portion D2 208 can be replicated together with the chunks that contain the first data portion 206 and the second data portion 208. At this point, no deduplication is needed because there are still two unique data portions (e.g., the first data portion D1 206 and the second data portion D2 208). Accordingly, the first data portion D1 206 is replicated in zone B 204 as replicated first data portion D1' 302. In addition, the second data portion D2 208 is replicated at zone B 202 as replicated second data portion D2' 304.

Figure 4:
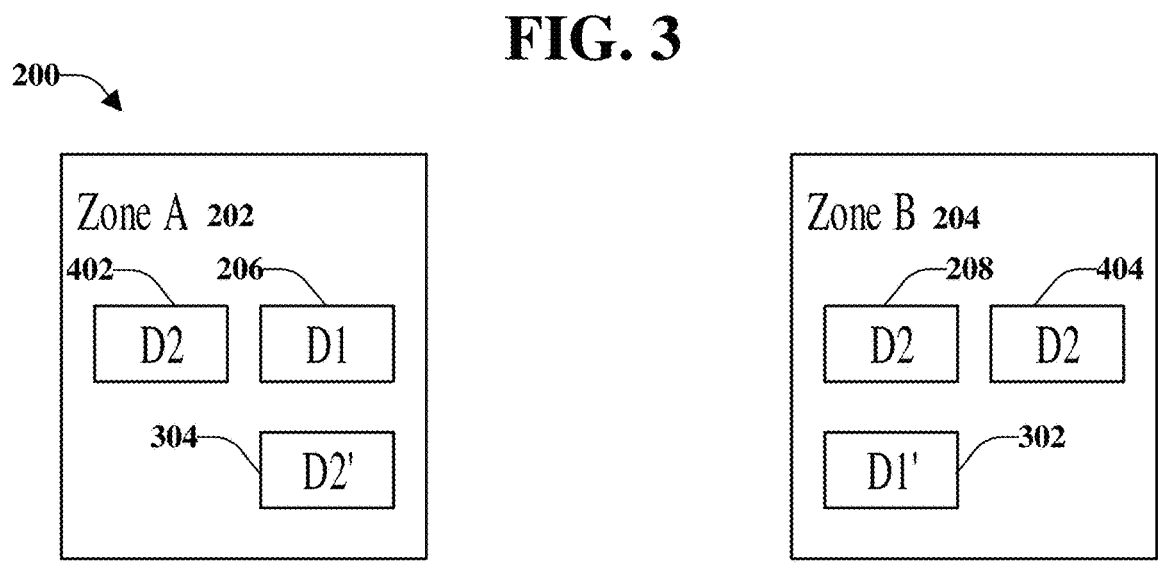
FIG. 4 illustrates an example, non-limiting representation of three copies of one data portion in the system of FIG. 2 in accordance with one or more embodiments described herein.

As illustrated in FIG. 4, two duplicates of data portion D2 208 are created in the system 200. For example, a first duplicate of data portion D2 402 is created in zone A 202. Further, a second duplicate of data portion D2 404 is created in zone B 204. Accordingly, zone B 204 owns two portions of the second data D2 (e.g., the second data D2 208 and the second duplicate of data portion D2 404).

Figure 5:
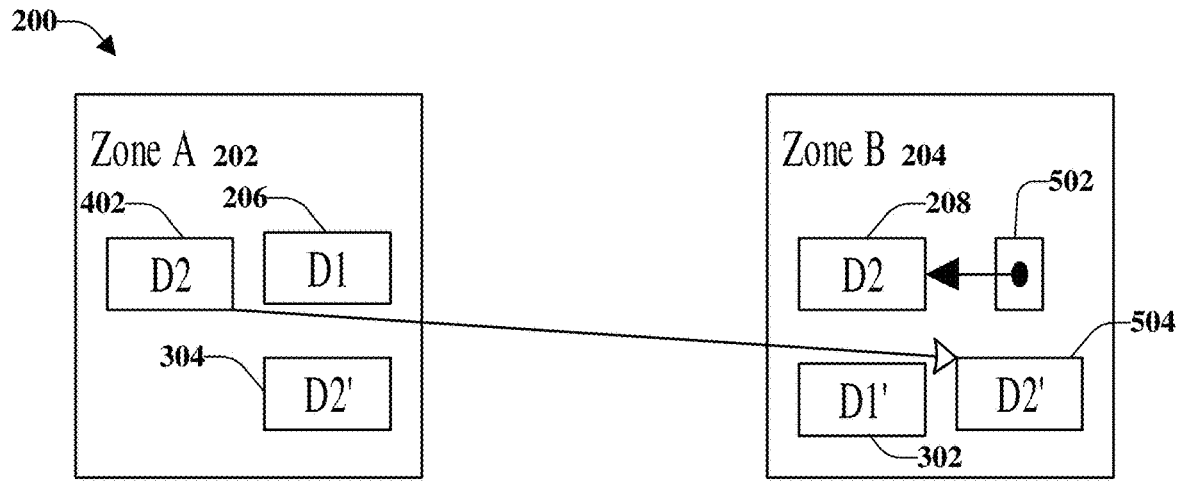
FIG. 5 illustrates an example, non-limiting representation of inline deduplication at zone level for the system of FIG. 2 in accordance with one or more embodiments described herein.

Since zone B 204 owns two copies of data portion D2, zone B 204 can perform inline deduplication. With reference to FIG. 5, to perform the inline data deduplication, zone B 204 can replace the second copy of D2 404 with a reference 502 to the first copy of D2 before the second copy is stored to a primary storage device (e.g., HDD).

As further illustrated in FIG. 5, zone A 202 owns only one (primary) copy of data portion D2 402. Therefore, this copy (e.g., data portion D2 402) is stored locally at zone A 202 and a request for replication at zone B 204 is sent (e.g., via the communication component 108). The replication of the data portion D2 402 is illustrated in zone B as replicated data D2' 504.

Figure 6:
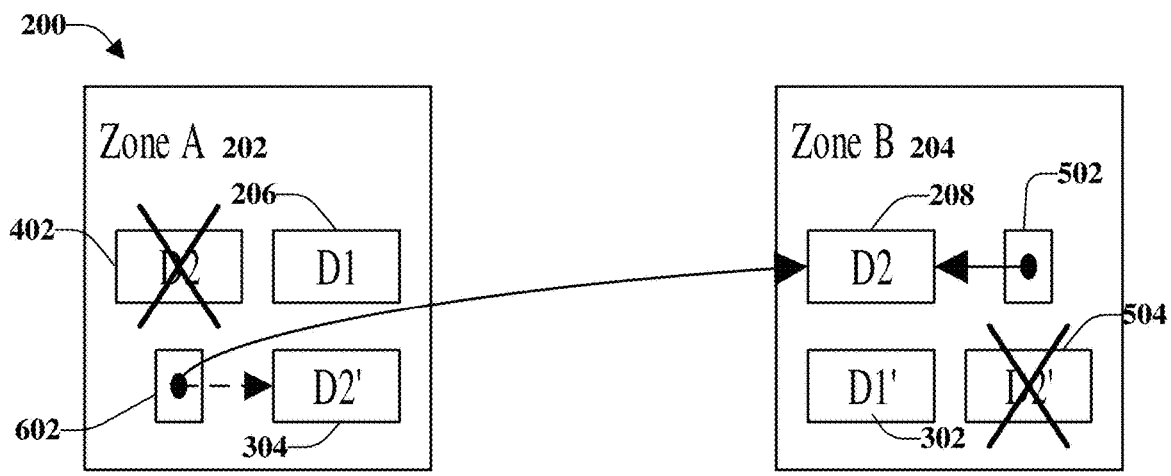
FIG. 6 illustrates an example, non-limiting representation of post-process deduplication at a geographically distributed level for the system of FIG. 2 in accordance with one or more embodiments described herein.
Figure 7:
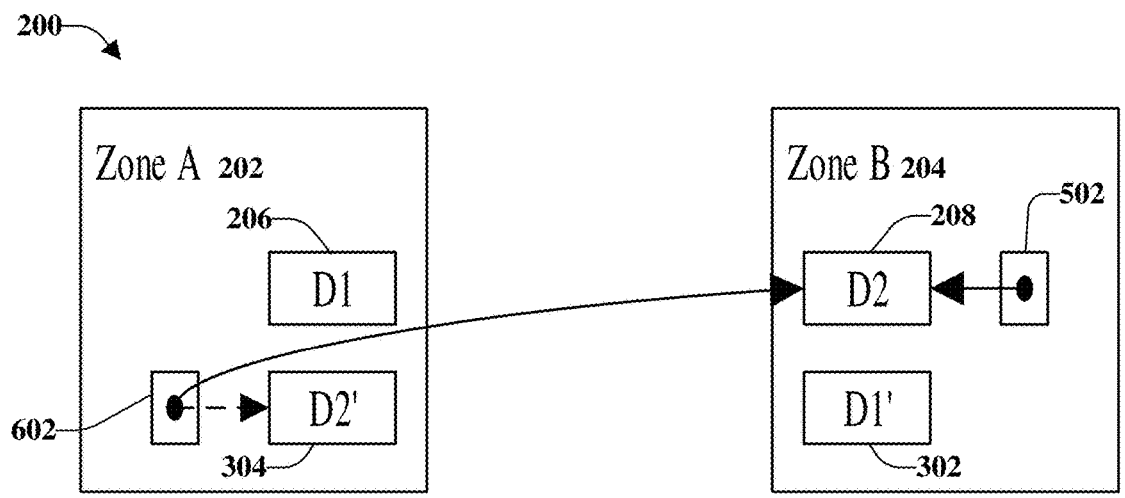
FIG. 7 illustrates an example, non-limiting representation of the system of FIG. 2 after capacity reclamation is completed in accordance with one or more embodiments described herein.

In some implementations, zone B 204 can detect a duplicate of data portion D2 (e.g., the data portion D2 402) at about the same time as the backup copy of D2 (e.g., the replicated data D2' 504) is received from zone A 202. Therefore, Zone B 204 can remove the copy of the replicated data D2' 504 and initiate post-process deduplication. For example, zone B 204 can request zone A 202 to perform deduplication. Therefore, as illustrated in FIG. 6, zone A 202 can replace its copy of data portion D2 402 with a reference 602 to the copy owned by zone B 204 (e.g., the data portion D2 208). The primary copy of data portion D2 402 owned by zone A 202 and its backup copy (e.g., copy of the replicated data D2' 504) are subject for garbage collection. FIG. 7 illustrates the final layout of data portions stored at zone A 202 and zone B 204.

It is noted that in the examples of FIGS. 2-7, zone A 202 includes a reference 602 to data portion D2 208 owned by a remote zone (e.g., zone B 204). However, zone A 202 can continue to use the local backup copy of the remote data portion (e.g., the replicated second data portion D2' 304) to facilitate data reads. The can be safely performed because chunks in ECS can be immutable.

In FIG. 5, zone A 202 misses the chance to perform deduplication using its copy of data portion D2 and the backup copy of D2 from zone B 204. This is because ECS can perform deduplication for various types of data portions. Deduplication can work for blocks, or 2 MB object segments, or objects themselves. There is a very limited sense in doing deduplication for chunks, however. Therefore, new data portions are to be protected via replication together with their parent chunks regardless of deduplication. Then, the approach described herein is more efficient because it allows the one or more zones to maintain an index of fingerprints for the data portions it owns only. Zone A 202 in FIG. 5 would need a global index of fingerprints to perform deduplication.

The various aspects discussed herein provide a data deduplication that can be practical to implement. The various aspects combine different techniques to obtain reasonable inline overheads and high efficiency of data deduplication in a GEO environment.

Figure 8:
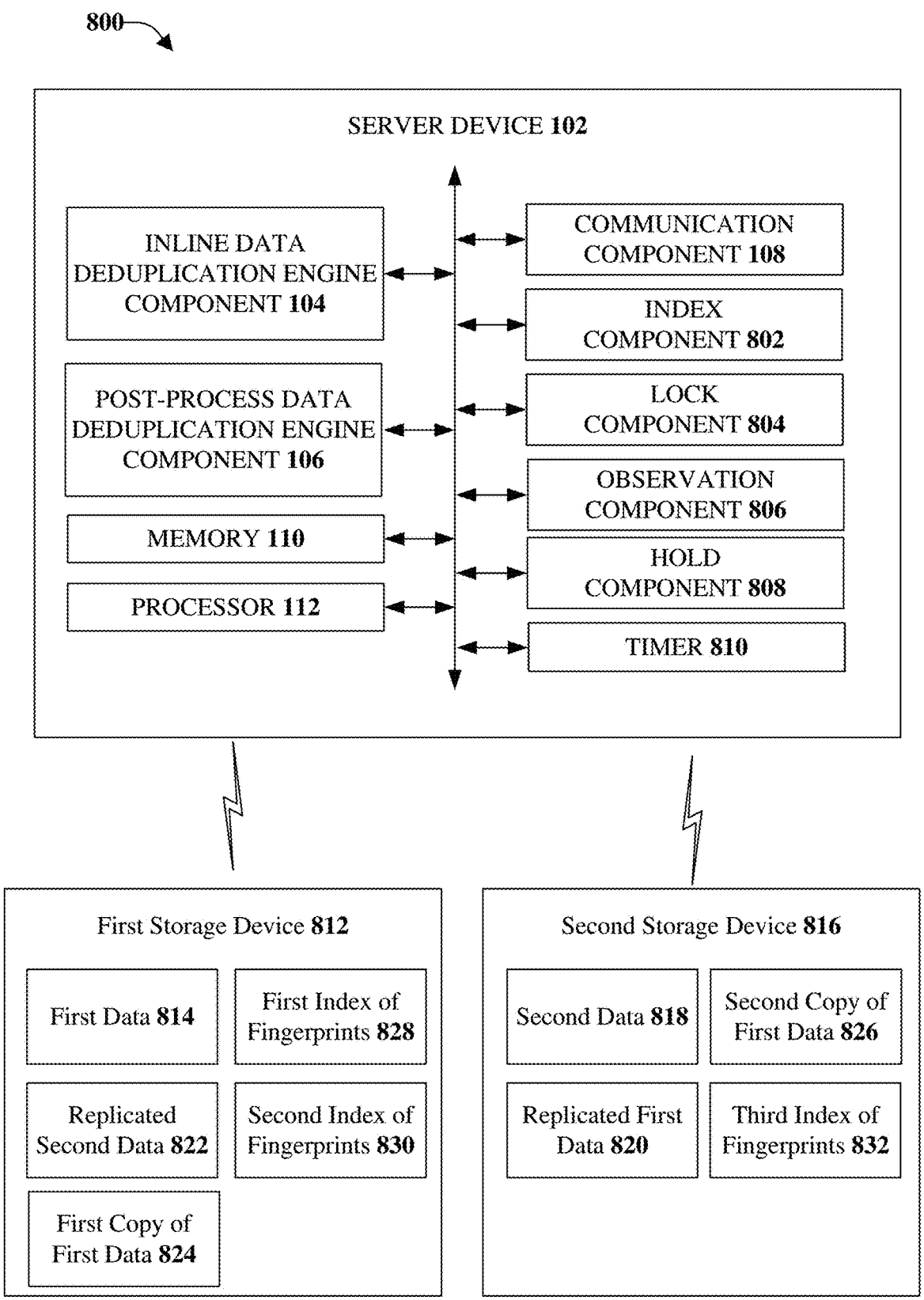
FIG. 8 illustrates an example, non-limiting system that performs in-line and post-process data deduplication across storage devices in an elastic cloud storage environment in accordance with one or more embodiments described herein.

FIG. 8 illustrates an example, non-limiting, system 800 that performs in-line and post-process data deduplication across storage devices in an elastic cloud storage environment in accordance with one or more embodiments described herein. Repetitive description of like elements employed in other embodiments described herein is omitted for sake of brevity.

The system 800 can comprise one or more of the components and/or functionality of the system 100, the system 200, and vice versa. The system 800 can comprise an index component 802, a lock component 804, an observation component 806, a hold component 808, and a timer 810.

As illustrated, a first storage device 812 (e.g., the first storage device 114, zone B 204) can comprise first data 814 and a second storage device 816 (e.g., the second storage device 116, zone A 202) can comprise second data 818. The first storage device 812 and the second storage device 816 can be storage devices of an elastic cloud storage system. The second storage device 816 can replicate the first data 814 (e.g., replicated first data 820) and the first storage device 812 can replicate the second data 818 (e.g., replicated second data 822). In this example, the first data 814 and the second data 818 are different data.

A first copy of the first data 824 can be added to the first storage device 812 and a second copy of the first data 826 can be added to the second storage device 816. The first storage device 812 can determine that it owns two copies of the first data (e.g., the first data 814 and the first copy of first data 824). Therefore, the inline data deduplication engine component 104 can facilitate a first deduplication at the first storage device 812. For example, the inline data deduplication engine component 104 can facilitate replacement of the first copy of first data 824 with a reference (not shown) to the first data 814.

Upon or after completion of the inline deduplication at the first storage device 812, the communication component 108 can send a request for a second deduplication at the second storage device 816. For example, the first storage device 812 can determine that the second storage device 816 contains duplicate data (e.g., the second copy of the first data 826) based on a request received from the second storage device 816 to replicate the duplicate data at the first storage device 812.

Based on the request, the post-process data deduplication engine component 106 can facilitate second deduplication of the second copy of first data 826 at the second storage device 816. For example, the post-process data deduplication engine component 106 can facilitate the second deduplication based on a post-process deduplication that replaces the second copy of first data 826 with a reference (not shown) to the first data 814 at the first storage device 812.

According to an implementation, the index component 802 can maintain, at the first storage device 812, a first index of fingerprints 828 for the first data 814, and a second index of fingerprints 830 for the first copy of first data 824. Further, the index component 802 can maintain, at the second storage device 816, a third index of fingerprints 832 for the second copy of first data 826.

Further, in some implementations the lock component 804 can designate the first data 814 at the first storage device 812 as unchangeable data (e.g., immutable data). In addition, the observation component 806 can detect a collision between the first removal of the first copy of first data 824 and the second removal of the second copy of first data 826. For example, both storage devices can detect duplicate copies and can request the other storage device to perform deduplication at substantially the same time. The detection by the observation component 806 can be based on the first data 814 being the unchangeable data. The hold component 808 can, at least temporarily, halt the first removal and the second removal based on the collision detected by the observation component 806. Upon or after detection of the collision, the timer 810 can be started. For example, the timer 810 can track an amount of time that has elapsed since the collision was detected. After a defined amount of time, the inline data deduplication engine component 104 and/or the post-process data deduplication engine component 106 can resume the first removal and the second removal.

It is noted that, inline deduplication should be used whenever possible. However, inline deduplication should not be used everywhere. For example, it can be risky and/or impractical to completely rely on inline deduplication for GEO setups comprising two or more zones.

For example, ignoring the fact that data portions can be owned by different GEO zones and using local view on a current data set to perform inline deduplication. Such a deduplication method is not an option because it can cause data loss events. In another example, inline data deduplication could be performed at the GEO level. This can imply calls to remote zones in the foreground of write transactions. This is also not an option because it is associated with too high inline overheads. As another example, inline data deduplication could be performed at the zone/cluster level only (e.g., deduplicate only data portions owned locally and do not perform deduplication at the GEO level). This somewhat eliminates the idea of deduplication by reducing its efficiency by N times, where N is the number of zones in a GEO setup. Therefore, all the above example options have obvious and severe defects. Accordingly, the aspects provided herein utilize the following hybrid two-level data deduplication technique: first, inline deduplication is used at the zone level and, therefore, post-process deduplication is used at the GEO level.

For inline deduplication at the zone/cluster level, there is a zone-local index of data portions owned locally. The deduplication engine (e.g., the inline data deduplication engine component 104, the post-process data deduplication engine component 106) uses this index to detect potential candidates for deduplication.

Data deduplication can use a byte-by-byte comparison for data portions with the same fingerprint. Accordingly, the various aspects align post-process deduplication at the GEO level with GEO replication. Further, the post-process deduplication discussed herein is deduplication that works inline with replication. Therefore, the respective deduplication engines (e.g., the inline data deduplication engine component 104, the post-process data deduplication engine component 106) in the one or more zones perform deduplication inline with data writes (the cluster level) and with replication traffic (the GEO level). At the GEO level, the engine can perform its checks at about the same time as an object completely arrives to the engines zone.

Another aspect relates to performing deduplication for two identical data portions owned by two different ECS zones. It is not safe for the deduplication engine to delete a local data portion copy and create a reference to a remote copy because the remote copy can be already deleted by that time. Thus, as disclosed herein a local copy can be protected from deletion with a "lock" (e.g., indicated as immutable data) and the remote zone can be requested to perform the deduplication by deleting its copy of the data portion. A possible collision when two ECS zones request one another to perform deduplication for the same pair of data portions can be simple to detect and handle. Namely, the lock mechanism mentioned above can be used to detect a collision. A timeout with random duration at each side with a subsequent retry (or multiple retries) can be used to handle a collision.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 9:
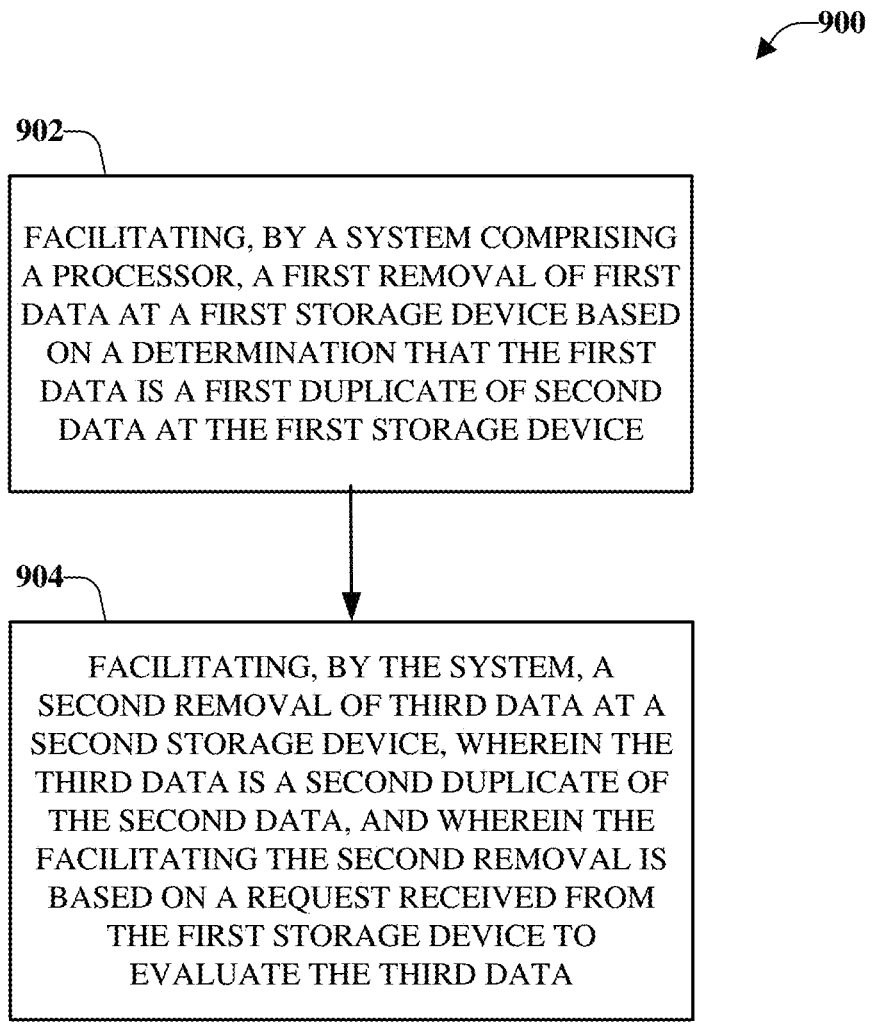
FIG. 9 illustrates a flow diagram of an example, non-limiting, method that facilitates data deduplication in accordance with one or more embodiments described herein.

FIG. 9 illustrates a flow diagram of an example, non-limiting, method 900 that facilitates data deduplication in accordance with one or more embodiments described herein. Repetitive description of like elements employed in other embodiments described herein is omitted for sake of brevity.

At 902, a system comprising a processor can facilitate a first removal of first data at a first storage device based on a determination that the first data is a first duplicate of second data at the first storage device (e.g., via the inline data deduplication engine component 104). According to an implementation, facilitating the first removal of the first data can comprise facilitating an inline deduplication that replaces the first data with a reference to the second data.

Further, at 904, the system can facilitate a second removal of third data at a second storage device (e.g., via the post-process data deduplication engine component 106). The third data can be a second duplicate of the second data. Further, facilitating the second removal can be based on a request received from the first storage device to evaluate the third data. The first storage device and the second storage device can be storage devices of an elastic cloud storage system.

The request for the second removal is in response to receiving, by the system, a replication request from the second storage device to replicate the third data at the first storage device. Further, it can be determined by the system that the third data is duplicate data.

According to an implementation, facilitating the second removal of the third data can comprise facilitating a post-process deduplication that replaces the third data with a reference to the second data at the first storage device. The first storage device and the second storage device can be geographically distributed devices of an ECS. Further to this implementation, facilitating the post-process deduplication can comprise aligning the post-process deduplication at a geographically distributed level with geographically distributed replication.

In some implementations, the method 900 can include maintaining, by the system and at the first storage device, a first index of first identifying information for the first data, and a second index of second identifying information for the second data. Further to this implementation, the method 900 can include maintaining, by the system and at the second storage device, a third index of third identifying information for the third data.

Additionally, or alternatively, the method 900 can include protecting, by the system, additional data portions through replication of the additional data portions with associated parent chunks. Protecting the additional data portions can be performed irrespective of the first removal of the first data.

Figure 10:
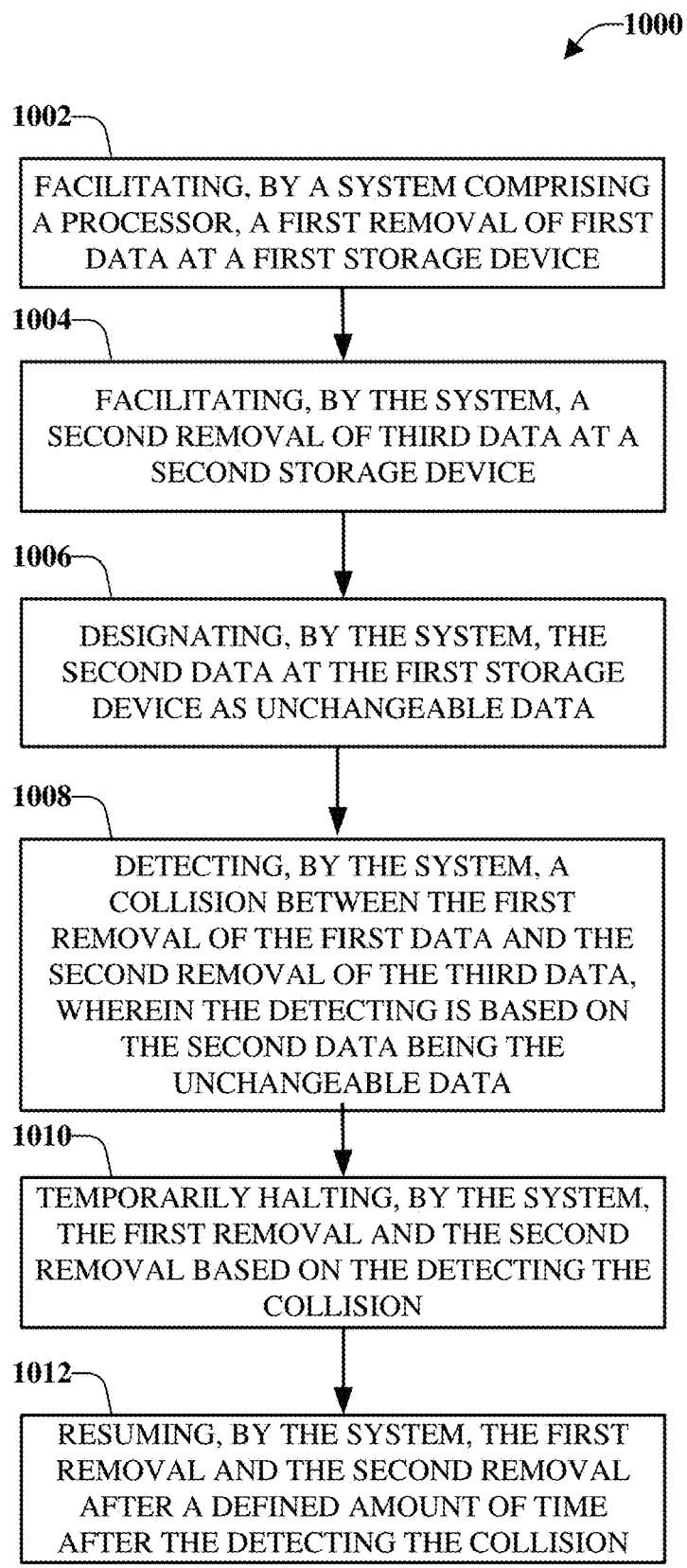
FIG. 10 illustrates a flow diagram of an example, non-limiting, method that facilitates collision avoidance during data deduplication in accordance with one or more embodiments described herein.

FIG. 10 illustrates a flow diagram of an example, non-limiting, method 1000 that facilitates collision avoidance during data deduplication in accordance with one or more embodiments described herein. Repetitive description of like elements employed in other embodiments described herein is omitted for sake of brevity.

At 1002, a system comprising a processor, can facilitate a first removal of first data at a first storage device. The removal of the first data can be facilitated based on a determination that the first data is a first duplicate of second data at the first storage device (e.g., via the inline data deduplication engine component 104). Further, at 1004, the system can facilitate a second removal of third data at a second storage device. The third data can be a second duplicate of the second data. Further, facilitating the second removal can be based on a request received from the first storage device to evaluate the third data. According to an implementation, facilitating the first removal of the first data and facilitating the second removal of the third data can comprise facilitating an efficiency of data deduplication in a geographically distributed environment.

The method 1000 can also include, designating, by the system, the second data at the first storage device as unchangeable data, at 1006 (e.g., via the lock component 804). For example, the second data at the first storage device can be marked as immutable data.

According to some implementations, the method 1000 can also include detecting, by the system, at 1008, a collision between the first removal of the first data and the second removal of the third data (e.g., via the observation component 806). The detection can be based on the second data being the unchangeable data. At 1010, the method 1000 can include temporarily halting the first removal and the second removal based on detecting the collision (e.g., via the hold component 808). After a defined amount of time after the detection of the collision, the method 1000 can include resuming the first removal and the second removal (e.g., via the inline data deduplication engine component 104 and the post-process data deduplication engine component 106).

Figure 11:
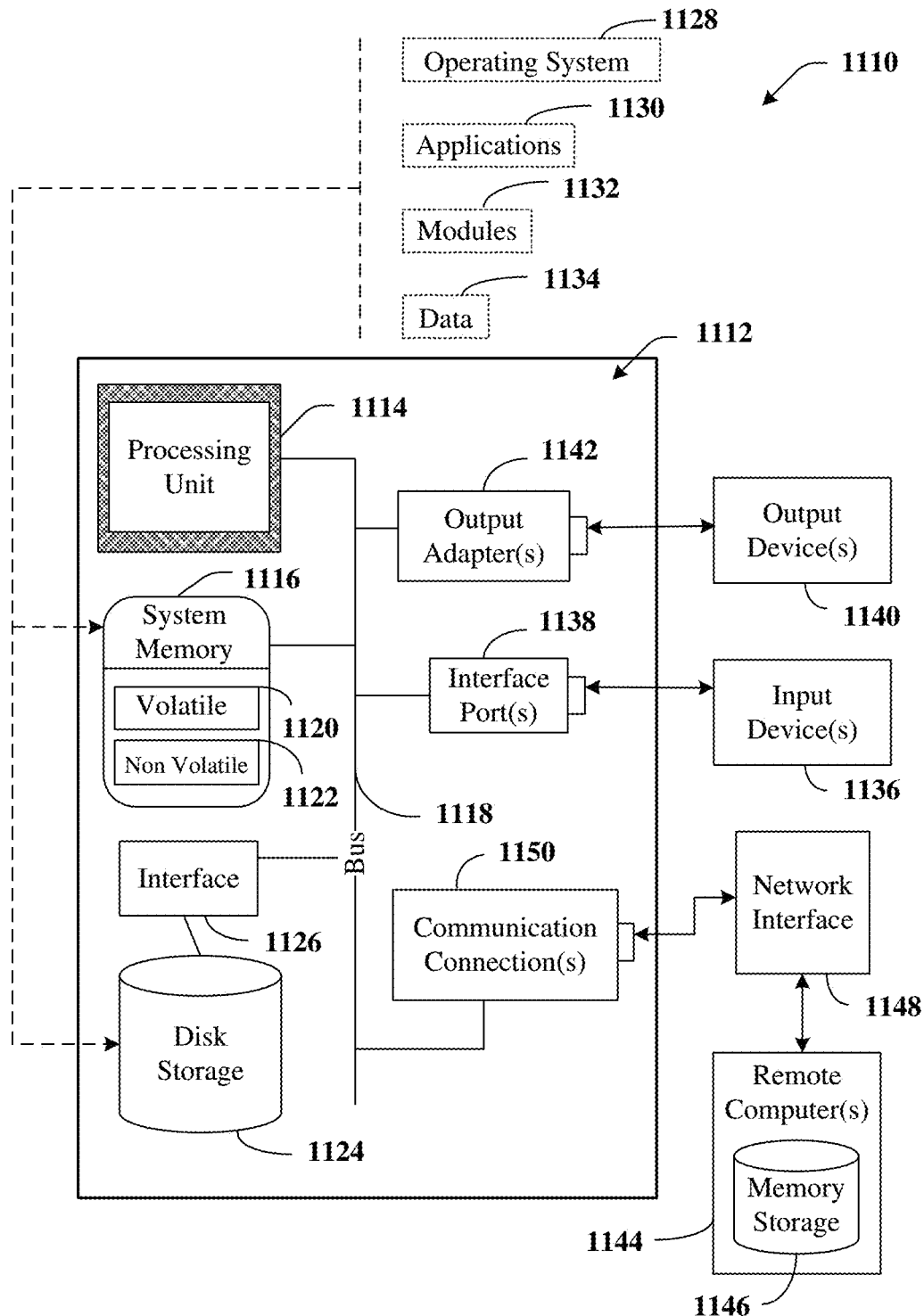
FIG. 11 illustrates an example, non-limiting, computing environment in which one or more embodiments described herein can be facilitated.

In order to provide a context for the various aspects of the disclosed subject matter, FIG. 11 as well as the following discussion are intended to provide a brief, general description of a suitable environment in which the various aspects of the disclosed subject matter can be implemented.

With reference to FIG. 11, an example environment 1110 for implementing various aspects of the aforementioned subject matter comprises a computer 1112. The computer 1112 comprises a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 comprises volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can comprise read only memory (ROM), programmable ROM (PROM), electrically programmable ROM (EPROM), electrically erasable PROM (EEPROM), or flash memory. Volatile memory 1120 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also comprises removable/non-removable, volatile/non-volatile computer storage media. FIG. 11 illustrates, for example a disk storage 1124. Disk storage 1124 comprises, but is not limited to, devices like a magnetic disk drive, floppy disk drive, tape drive, Jaz drive, Zip drive, LS-100 drive, flash memory card, or memory stick. In addition, disk storage 1124 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software comprises an operating system 1128. Operating system 1128, which can be stored on disk storage 1124, acts to control and allocate resources of the computer 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 comprise, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 comprise, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically comprises many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/ IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 comprises, for exemplary purposes only, internal and external technologies such as, modems including regular telephone grade modems, cable modems and DSL modems, ISDN adapters, and Ethernet cards.

Figure 12:
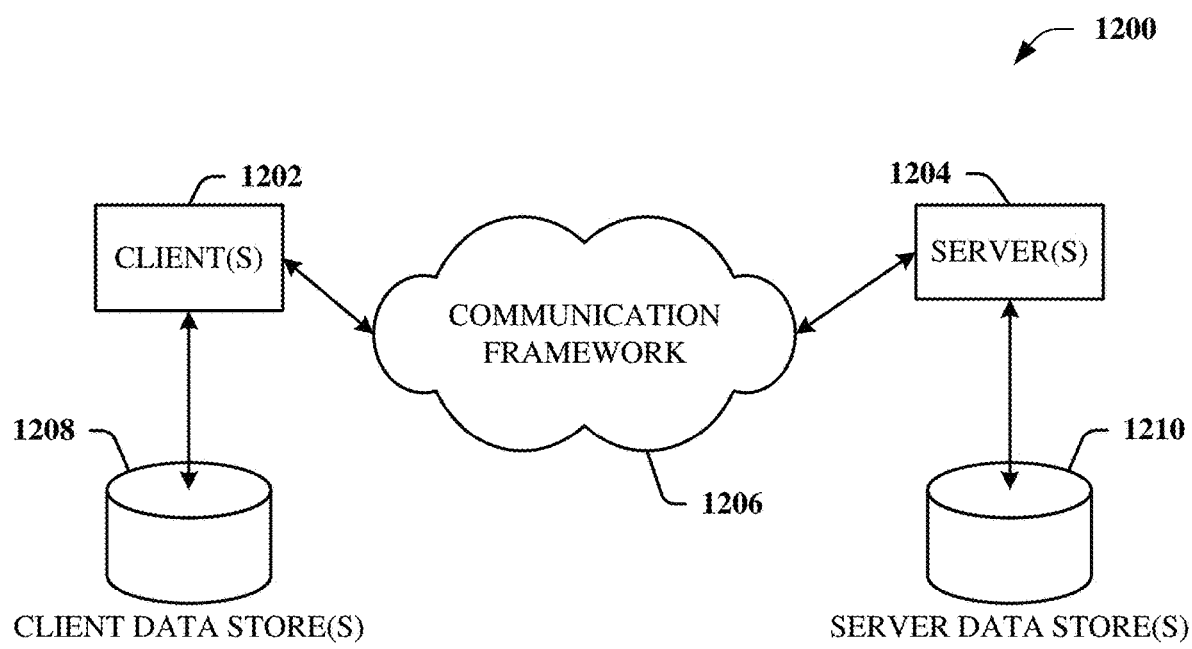
FIG. 12 illustrates an example, non-limiting, networking environment in which one or more embodiments described herein can be facilitated.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   facilitating, by a system comprising a processor, a first removal of first data at a first storage device based on a determination that the first data is a first duplicate of second data at the first storage device;
   facilitating, by the system, a second removal of third data at a second storage device, wherein the third data is a second duplicate of the second data, and wherein the facilitating the second removal is based on a request to evaluate the third data;
   temporarily halting, by the system, the first removal and the second removal based on a detection of a collision caused by the first removal and the second removal being performed at a same time; and
   resuming, by the system, the first removal and the second removal after a defined amount of time after the detection of the collision.

2. The method of claim 1, wherein the facilitating the first removal of the first data comprises facilitating an inline deduplication that replaces the first data with a reference to the second data.

3. The method of claim 1, wherein the facilitating the second removal of the third data comprises facilitating a post-process deduplication that replaces the third data with a reference to the second data at the first storage device.

4. The method of claim 3, wherein the first storage device and the second storage device are geographically distributed devices, and wherein the facilitating the post-process deduplication comprises aligning the post-process deduplication at a geographically distributed level with geographically distributed replication.

5. The method of claim 1, wherein the first storage device and the second storage device are storage devices of an elastic cloud storage system.

6. The method of claim 1, further comprising:
   designating, by the system, the second data at the first storage device as unchangeable data.

7. The method of claim 6, further comprising:
   detecting, by the system, the collision between the first removal of the first data and the second removal of the third data, resulting in the detection of the collision, wherein the detecting is based on the second data being the unchangeable data.

8. The method of claim 1, further comprising:
   maintaining, by the system and at the first storage device, a first index of first identifying information for the first data, and a second index of second identifying information for the second data; and
   maintaining, by the system and at the second storage device, a third index of third identifying information for the third data.

9. The method of claim 1, wherein the facilitating the second removal is in response to:
   receiving, by the system, a replication request from the second storage device to replicate the third data at the first storage device; and
   determining, by the system, that the third data is duplicate data.

10. The method of claim 1, further comprising:
    protecting, by the system, additional data portions through replication of the additional data portions with associated parent chunks, wherein the protecting the additional data portions is performed irrespective of the first removal of the first data.

11. The method of claim 1, wherein the facilitating the first removal of the first data and the facilitating the second removal of the third data comprises facilitating an efficiency of data deduplication in a geographically distributed environment.

12. A system, comprising:
    a processor; and
    a memory that stores executable instructions that, when executed by the processor, facilitate performance of operations, comprising:
      facilitating a first deduplication of first data at a first storage device based on a determination that the first storage device comprises duplicated data;
      sending a request for a second deduplication at a second storage device after completion of the first deduplication at the first storage device;
      facilitating the second deduplication of second data at the second storage device, wherein the second data comprises a copy of the duplicated data;
      temporarily halting the first deduplication and the second deduplication based on a detection of a collision caused by the first deduplication and the second deduplication being performed at a same time; and
      resuming the first deduplication and the second deduplication after a defined amount of time after the detection of the collision.

13. The system of claim 12, wherein the operations further comprise:
    facilitating the first deduplication based on an inline deduplication that replaces the duplicated data with a reference to the first data.

14. The system of claim 12, wherein the operations further comprise facilitating the second deduplication based on a post-process deduplication that replaces the second data with a reference to the first data at the first storage device.

15. The system of claim 12, wherein the operations further comprise:
    maintaining at the first storage device, a first index of fingerprints for the first data; and
    maintaining at the second storage device, a second index of fingerprints for the second data.

16. The system of claim 12, wherein the first storage device and the second storage device are storage devices of an elastic cloud storage system.

17. A non-transitory computer-readable medium comprising instructions that, in response to execution, cause a system comprising a processor to perform operations, comprising:
    facilitating a first removal of first data at a first device based on a determination that the first data is duplicate data of second data at the first device;
    facilitating a second removal of third data at a second device, wherein the third data is the duplicate data of the second data, wherein the facilitating the second removal is based on a request to remove the duplicate data, and wherein the first device was alerted to the duplicate data based on a replication request from the second device to replicate the third data at the first device;
    temporarily halting the first removal and the second removal based on a detection of a collision caused by the first removal and the second removal being performed at a same time; and
    resuming the first removal and the second removal after a defined amount of time after the detection of the collision.

18. The non-transitory computer-readable medium of claim 17, wherein the operations further comprise:
    designating the second data at the first device as immutable data, wherein the immutable data is used to resolve deduplication conflicts.

19. The non-transitory computer-readable medium of claim 17, wherein the operations further comprise:
    maintaining a first identification for the first data, and a second identification of the second data at the first device; and
    maintaining a third identification for the third data at the second device.

20. The non-transitory computer-readable medium of claim 17, wherein the operations further comprise:
    facilitating the first removal of the first data using an inline deduplication that replaces the first data with a first reference to the second data; and
    facilitating the second removal of the third data based on a post-process deduplication that replaces the third data with a second reference to the second data at the first device.

\* \* \* \* \*